United States Patent
Chang et al.

(10) Patent No.: US 10,237,905 B2
(45) Date of Patent: Mar. 19, 2019

(54) DEVICE TO DEVICE (D2D) COMMUNICATION METHOD AND APPARATUS

(71) Applicant: ELECTRONICS AND TELECOMMUNICATIONS RESEARCH INSTITUTE, Daejeon (KR)

(72) Inventors: Kapseok Chang, Daejeon (KR); Byung-Jae Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 15/321,852

(22) PCT Filed: May 5, 2015

(86) PCT No.: PCT/KR2015/005683
§ 371 (c)(1),
(2) Date: Dec. 23, 2016

(87) PCT Pub. No.: WO2015/199352
PCT Pub. Date: Dec. 30, 2015

(65) Prior Publication Data
US 2017/0156143 A1 Jun. 1, 2017

(30) Foreign Application Priority Data

Jun. 24, 2014 (KR) .......................... 10-2014-0077679
Jun. 25, 2014 (KR) .......................... 10-2014-0078437
(Continued)

(51) Int. Cl.
*H04W 76/14* (2018.01)
*H04B 17/336* (2015.01)
(Continued)

(52) U.S. Cl.
CPC .......... *H04W 76/14* (2018.02); *H04B 17/336* (2015.01); *H04W 72/1284* (2013.01); *H04W 76/11* (2018.02); *H04W 72/02* (2013.01)

(58) Field of Classification Search
None
See application file for complete search history.

(56) References Cited

U.S. PATENT DOCUMENTS

| 9,462,622 B2 | 10/2016 | Jang et al. |
| 2012/0134344 A1 | 5/2012 | Yu et al. |

(Continued)

FOREIGN PATENT DOCUMENTS

| EP | 2685779 A1 | 1/2014 |
| KR | 10-2009-0106053 A | 10/2009 |
| WO | WO-2013/073915 A1 | 5/2013 |

OTHER PUBLICATIONS

R1-141929, 3GPP TSG RAN WG1 Meeting #77, Seoul, Korea, May 10, 2014.
(Continued)

*Primary Examiner* — Kodzovi Acolaste
(74) *Attorney, Agent, or Firm* — Rabin & Berdo, P.C.

(57) ABSTRACT

A first terminal generates a first scheduling request signal including information about first data resources for data transmission when the first terminal tries to reserve the first data resources. The first terminal generates a first scheduling request indication signal providing notification that the first scheduling request signal is to be transmitted. The first terminal transmits the first scheduling request indication signal through a first request subslot included in a first scheduling request resource before transmitting the first scheduling request signal. The first terminal transmits the first scheduling request signal through a second request subslot included in the first scheduling request resource.

18 Claims, 6 Drawing Sheets

(30) Foreign Application Priority Data

Jun. 26, 2014 (KR) .......................... 10-2014-0079194
Jul. 22, 2014 (KR) .......................... 10-2014-0092728
May 11, 2015 (KR) .......................... 10-2015-0065577

(51) Int. Cl.
*H04W 76/11* (2018.01)
*H04W 72/12* (2009.01)
*H04W 72/02* (2009.01)

(56) References Cited

U.S. PATENT DOCUMENTS

| | | |
|---|---|---|
| 2013/0003689 A1 | 1/2013 | Kwon et al. |
| 2013/0308549 A1 | 11/2013 | Madan et al. |
| 2015/0009917 A1* | 1/2015 | Cho .................. H04W 74/0875 |
| | | 370/329 |
| 2015/0011230 A1 | 1/2015 | Noh et al. |
| 2016/0295603 A1* | 10/2016 | Li ..................... H04W 74/0858 |
| 2017/0055280 A1* | 2/2017 | Kim .................. H04W 72/0406 |

OTHER PUBLICATIONS

R1-142111, 3GPP TSG RAN WG1 Meeting #77, Seoul, Korea, May 10, 2014.

* cited by examiner

DEVICE TO DEVICE (D2D) COMMUNICATION METHOD AND APPARATUS

TECHNICAL FIELD

The present invention relates to a D2D communication method, that is, direct communication between terminals, and a terminal supporting the same.

BACKGROUND ART

Recently, standardization for introducing a device to device (D2D) communication service to a cellular communication system based on a licensed band has been in progress. In D2D communication, a terminal may directly communicate with another terminal without passing through a network (e.g., a base station).

Meanwhile, if terminals that are spatially adjacent perform D2D communication, the terminals may be controlled by a cellular base station, but only minimal help may be provided to the terminals, or no help from a cellular base station may be provided to the terminals.

Control by a base station means that the base station provides resources to devices in a centralized manner and in a contention-free manner. Accordingly, control by the base station may maximize throughput.

In contrast, if only minimal help is provided to a terminal or no help from a base station is provided to the terminal, it is difficult for resources to be scheduled in a centralized manner.

DISCLOSURE

Technical Problem

An object of the present invention is to provide a method and apparatus capable of realizing communication through contention-free-based resource allocation if only minimal help from a base station is provided to a terminal or no help from the base station is provided to the terminal.

An object of the present invention is to provide a method and apparatus for preventing interference generated by an unwanted signal if contention-free-based communication is performed in an unlicensed band that may be used by anyone if predetermined rules are observed.

An object of the present invention is to provide a method and apparatus for transmitting contention-free data in a wireless communication system.

An object of the present invention is to provide a method and apparatus for stably reserving resources through a scheduling request and a scheduling response.

An object of the present invention is to provide a method and apparatus capable of stably using reserved resources.

Technical Solution

In accordance with an embodiment of the present invention, a device to device (D2D) communication method of directly communicating, by a first terminal, with another terminal without passing through a network, is provided. The D2D communication method includes: generating a first scheduling request signal including information about first data resources for data transmission when the first data resources are to be reserved; generating a first scheduling request indication signal providing notification that the first scheduling request signal is to transmitted; transmitting the first scheduling request indication signal through a first request subslot included in a first scheduling request resource before transmitting the first scheduling request signal; and transmitting the first scheduling request signal through a second request subslot included in the first scheduling request resource.

The D2D communication method may further include receiving a first scheduling response signal, including information about the remaining second data resources that belong to the first data resources and that are other than data resources having a collision possibility, through a first scheduling response resource for scheduling response from a second terminal which has received the first scheduling request signal.

The receiving the first scheduling response signal may include: receiving a first scheduling response indication signal, providing notification that the first scheduling response signal is to be transmitted, through a first response subslot included in the first scheduling response resource from the second terminal and receiving the first scheduling response signal through a second response subslot included in the first scheduling response resource from the second terminal after receiving the first scheduling response indication signal.

The D2D communication method may further include: generating a first data transmission indication signal providing notification that first data is to be transmitted; transmitting the first data transmission indication signal through a first data subslot included in the second data resources before transmitting the first data; and transmitting the first data using a second data subslot included in the second data resources.

The first data resources may be at least one resource block including a plurality of resource elements (REs).

The first scheduling request resource may be at least one resource block including a plurality of REs.

The first scheduling response resource may be at least one resource block including a plurality of REs.

The first scheduling request resource may belong to a request resource block group including a plurality of scheduling request resource blocks.

The second scheduling response resource may belong to a response resource block group including a plurality of scheduling response resource blocks.

The request resource block group and the response resource block group may be included in a scheduling period.

The first data resources may belong to a data transmission period including a plurality of data transmission resource blocks.

The scheduling period and the data transmission period may be included in a contention-free period (CFP).

The generating the first scheduling request signal may include generating the first scheduling request signal including a preamble, a header, and a payload.

The header may include information indicating that the first scheduling request signal is a signal for a scheduling request.

The payload may include resource block indexes indicative of the first data resources.

The payload may further include a link identifier indicative of a link between the first terminal and the second terminal when the second terminal is a terminal peered with the first terminal.

The transmitting the first data transmission indication signal may include transmitting the first data transmission indication signal through each of the first data subslots from a first data transmission resource block included in the data transmission period to the last data transmission resource block included in the second data resources.

The D2D communication method may further include receiving a second data transmission indication signal through at least one of the first data subslots included in the data transmission period from another terminal which has not reserved a data transmission resource block included in the data transmission period.

The transmitting the first data transmission indication signal may include transmitting the first data transmission indication signal through only the first data subslots of data transmission resource blocks included in the second data resources.

The generating the first scheduling request signal may include selecting at least one data transmission resource block that belongs to a plurality of data transmission resource blocks included in the CFP of a frame prior to a current frame and that has a low signal to interference noise ratio (SINR) as the first data resources, and generating the first scheduling request signal including information about a data transmission resource block that belongs to a plurality of data transmission resource blocks included in the CFP of the current frame and that corresponds to the first data resources.

The selecting the at least one data transmission resource block as the first data resources may include calculating an average SINR during some frames prior to the current frame with respect to each of the data transmission resource blocks included in the CFP of the frame prior to the current frame.

The D2D communication method may further include operating in reception mode during at least one frame when the first data has been transmitted using the second data resources.

In accordance with another embodiment of the present invention, a device to device (D2D) communication method of directly communicating, by a first terminal, with another terminal without passing through a network is provided. The D2D communication method include: receiving a first scheduling request signal including information about first data resources for data transmission through a first scheduling request resource for a scheduling request from a second terminal; generating a first scheduling response signal including information about the remaining second data resources that belong to the first data resources and that are other than data resources having a collision possibility; and transmitting the first scheduling response signal through a second response subslot of a first response subslot and the second response subslot included in a first scheduling response resource for a scheduling response.

The D2D communication method may further include generating a first scheduling response indication signal providing notification that the first scheduling response signal is to be transmitted, and transmitting the first scheduling response indication signal through the first response subslot included in the first scheduling response resource before transmitting the first scheduling response signal.

The generating the first scheduling response signal may include determining the remaining data transmission resource blocks that belong to the first data resources and that are other than data transmission resource blocks indicated by the second scheduling request signal to be the second data resources when a second scheduling request signal is received from another terminal other than the second terminal.

The generating the first scheduling response signal may further include generating the first scheduling response signal including a preamble, a header, and a payload.

The header may include information indicating that the first scheduling response signal is a signal for a scheduling response.

The payload may include resource block indexes indicative of the first data resources.

The payload may further include a link identifier indicative of a link between the first terminal and the second terminal when the second terminal is a terminal peered with the first terminal.

In accordance with yet another embodiment of the present invention, a device to device (D2D) communication method of directly communicating, by a first terminal, with another terminal without passing through a network is provided. The D2D communication method may include: generating a first data transmission indication signal providing notification that first data is to be transmitted; transmitting the first data transmission indication signal through a first data subslot of the first data subslot and a second data subslot included in a first data transmission resource block before transmitting the first data; and transmitting the first data through the second data subslot included in the first data transmission resource block.

The transmitting the first data transmission indication signal may include transmitting the first data transmission indication signal through each of the first data subslots from a first data transmission resource block included in the data transmission period to the first data transmission resource block.

The D2D communication method may further include: selecting a second data transmission resource block based on a signal to interference noise ratio (SINR) of each of a plurality of data transmission resource blocks included in the CFP of a frame prior to a current frame in order to reserve the second data transmission resource block including the first data transmission resource block before the transmitting the first data transmission indication signal; generating a first scheduling request signal including information about the second data transmission resource block included in the CFP of the current frame; and transmitting the first scheduling request signal through a second request subslot of a first request subslot and the second request subslot included in a first scheduling request resource block of the scheduling period.

Advantageous Effects

In accordance with an embodiment of the present invention, resources for a scheduling request, resources for a scheduling response, and the reserved resources of a data transmission period can be stably protected against a third party through distributed scheduling in a contention-free period of a wireless communication system in which an unlicensed band is used.

In accordance with another embodiment of the present invention, efficiency of spatial reuse can be improved and the entire system capacity can be increased by predicting surrounding resource collisions through a scheduling request process and a scheduling response process.

MODE FOR INVENTION

Figure 1:
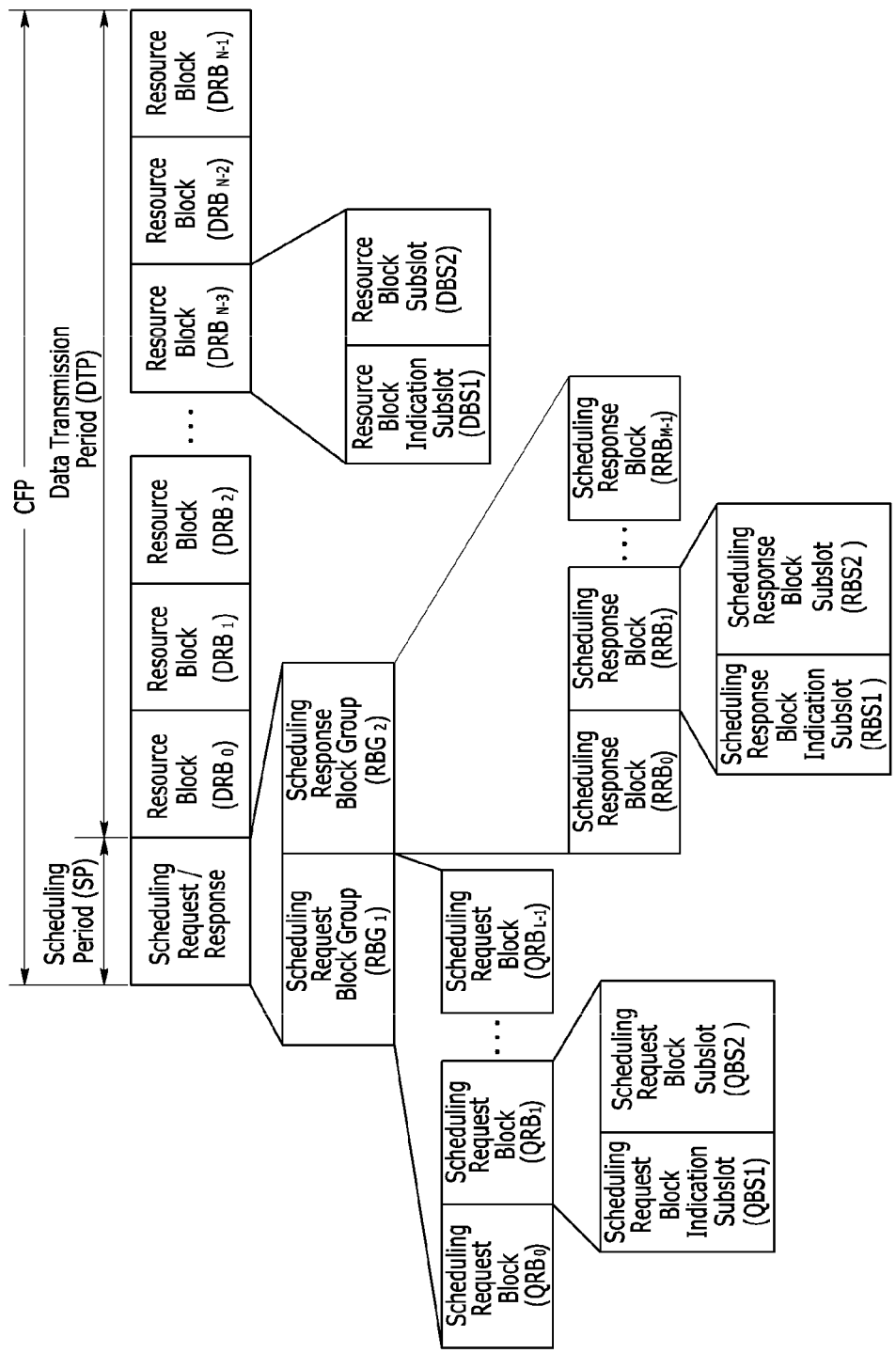
FIG. 1 is a diagram illustrating a contention-free period (CFP) for distributed scheduling in accordance with an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and may include some or all of the functions of the terminal, MT, MS, AMS, HR-MS, SS, PSS, AT, and UE.

Furthermore, a base station (BS) may refer to an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) functioning as a base station, a high reliability relay station (HR-RS) functioning as a base station, a macro base station, or a small base station, and may include some or all of the functions of the BS, ABS, HR-BS, nodeB, eNodeB, AP, RAS, BTS, MMR-BS, RS, HR-RS, macro base station and small base station.

FIG. 1 is a diagram illustrating a contention-free period (CFP) for distributed scheduling in accordance with an embodiment of the present invention. Specifically, a terminal may use contention-free resources for data transmission based on distributed scheduling in a contention-free period (CFP) of FIG. 1. The CFP may be included in a radio frame.

Hereinafter, for convenience of description, it is assumed that inband half duplex (IHD) is applied to all the terminals and that all the terminals have been synchronized. Furthermore, hereinafter, for convenience of description, it is assumed that terminals participating in a distributed scheduling-based contention-free communication process in a contention-free period (CFP) are terminals after peering (peered terminals). However, an embodiment of the present invention is not limited to such assumptions. An embodiment of the present invention may also be applied to a terminal prior to peering (e.g., a terminal in a discovering process) or a terminal in an un-peering process. In this case, the peering process is a process of connecting peer terminals, and means a process of setting up a link between a discovering peer and a discovered peer. The process of setting up a link between peers may include a process of exchanging pieces of information such as terminal capabilities, and a process of determining parameters such as a link-related identifier, a quality of service (QoS) class, and a link range. In FIG. 1, L (L is a natural number), M (M is a natural number), and N (N is a natural number) indicative of the number of resource blocks may be the same or different.

A CFP includes a scheduling period SP for scheduling and a data transmission period DTP for data transmission.

The SP includes a scheduling request block group RBG1 for a scheduling request and a scheduling response block group RBG2 for a scheduling response.

The scheduling request block group RBG1 includes L scheduling request resource blocks $QRB_0$-$QRB_{L-1}$. In this case, one of the scheduling request resource blocks $QRB_0$-$QRB_{L-1}$ includes a plurality of resource elements (REs). Specifically, each of the scheduling request resource blocks $QRB_0$-$QRB_{L-1}$ includes a scheduling request resource block indication subslot (hereinafter, a 'first request subslot') QBS1 for transmitting a scheduling request indication signal, and a scheduling request resource block subslot (hereinafter, a 'second request subslot') QBS2 for transmitting a scheduling request message.

The scheduling response block group RBG2 includes M scheduling response resource blocks $RRB_0$-$RRB_{M-1}$. In this case, each of the scheduling response resource blocks $RRB_0$-$RRB_{M-1}$ includes a plurality of REs. Specifically, each of the scheduling response resource blocks $RRB_0$-$RRB_{M-1}$ includes a scheduling response resource block indication subslot (hereinafter, a 'first response subslot') RBS1 for transmitting a scheduling response indication signal, and a scheduling response resource block subslot (hereinafter, a 'second response subslot') RBS2 for transmitting a scheduling response message.

The data transmission period (DTP) includes N data transmission resource blocks $DRB_0$-$DRB_{N-1}$ for data transmission. In this case, each of the data transmission resource blocks $DRB_0$-$DRB_{N-1}$ includes a plurality of REs. Specifically, each of the data transmission resource blocks $DRB_0$-$DRB_{N-1}$ includes a data transmission resource block indication subslot (hereinafter, a 'first data subslot') DBS1 for transmitting a data transmission indication signal and a data transmission resource block subslot (hereinafter, a 'second data subslot') DBS2 for transmitting data. The second data subslot DBS2 is placed next the first data subslot DBS1.

Although minimal help from a base station is provided to a terminal performing D2D communication or no help from the base station is provided to the terminal, a distributed scheduling-based contention-free communication method may be used to realize communication through contention-free-based resource allocation.

In the distributed scheduling-based contention-free communication method, each of terminals transmits a message for the scheduling of a desired resource block of a total of available resource blocks $DRB_0$-$DRB_{N-1}$ through the scheduling request block group RBG1. Terminals in reception mode in the scheduling request block group RBG1 check resource blocks that belong to data transmission resource blocks requested by other terminals and that collide against each other by monitoring scheduling request messages transmitted by other terminals.

A terminal that transmits a signal in a scheduling response resource block $RRB_0$ temporally subsequent to the scheduling request block group RBG1 carries a scheduling response message, including information about the remaining resource blocks that belong to data transmission resource blocks requested by a terminal that wants to communicate with the terminal that transmits the signal and that are other than resource blocks having a collision possibility, on a specific scheduling response block and transmits the scheduling response message. In this case, each of terminals wanting to transmit scheduling response messages determines a scheduling response block on which a scheduling response message will be carried on a contention basis until the scheduling response block group RBG2 is terminated.

In a data transmission period (CFP) temporarily subsequent to the scheduling response block group RBG2, terminals use a data transmission resource block, obtained through the aforementioned scheduling request process and scheduling response process, for data communication in a contention-free manner.

Meanwhile, the aforementioned distributed scheduling-based contention-free communication method may not be suitable for an unlicensed band. Specifically, predetermined data transmission resources may be guaranteed because only permitted terminals participate in a scheduling request process and a scheduling response process competitively in a licensed band. In an unlicensed band, however, third terminals complying with other standard systems may participate in a scheduling request process and a scheduling response process competitively if they satisfy predetermined rules. Accordingly, an actual data transmission period (DTP) may be lost partially or entirely because interference is generated between resources in a scheduling request process and a scheduling response process. Furthermore, data transmission resources may not be stably guaranteed because the data transmission resources are hindered by third terminals although the data transmission resources are reserved through a scheduling request process and a scheduling response process. Such problems can be solved through the first request subslot QBS1, the first response subslot RBS1, and the first data subslot DBS1 illustrated in FIG. 1.

A distributed scheduling method according to the CFP of FIG. 1 is described in detail with reference to FIGS. 2 to 4.

Figure 2:
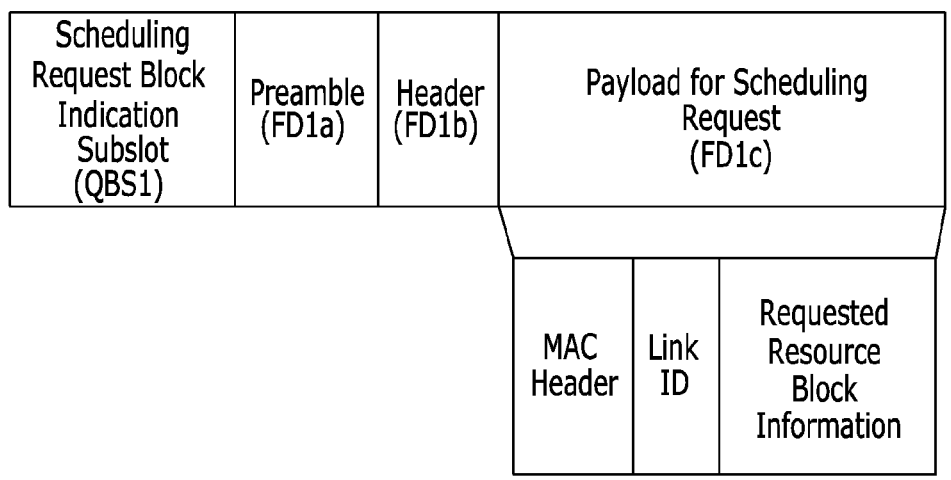
FIG. 2 is a diagram illustrating the format of a scheduling request resource block.

FIG. 2 is a diagram illustrating the format of a scheduling request resource block. Specifically, a scheduling request indication signal may be transmitted through a first request subslot QBS1, and a scheduling request message may be transmitted through a second request subslot QBS2.

The scheduling request message (packet) includes a preamble FD1a, a header FD1b, and a payload FD1c including scheduling request information about a terminal.

The preamble FD1a may be placed next to the first request subslot QBS1.

The header FD1b includes information indicating whether the packet including the header FD1b is for a scheduling request or for a scheduling response. Specifically, the header FD1b may include a medium access control (MAC) header, a link identifier, and information about a data transmission resource block requested by a terminal. In this case, the link identifier means an identifier linked with another terminal(s) in the peering process of a terminal. The link identifier is different from an identifier allocated to other peering terminals. Meanwhile, the header FD1b may include MAC identifiers between peered terminals (e.g., the MAC identifier of each of peered terminals) instead of a link identifier. However, if the MAC identifier is included in the header FD1b, signaling overhead may be increased because a payload length is increased.

Information about a data transmission resource block within the payload FD1c means information about the index of a resource block that belongs to data transmission resource blocks $DRB_0$-$DRB_{N-1}$ included in a data transmission period (DTP) and that is to be requested by a terminal. Specifically, a method of selecting, by a terminal, a data transmission resource block to be requested in a specific CFP includes a method of selecting, by a terminal, a specific data transmission resource block based on the signal to interference noise ratio (SINR) of each data transmission resource block (hereinafter, an 'SINR-based selection method'). In the SINR-based selection method, if a terminal tries to reserve a data transmission resource block in a current CFP, the terminal may select a data transmission resource block(s) having a low SINR (SINR descending order) with reference to an average SINR level of data transmission resource blocks $DRB_0$-$DRB_{N-1}$ in a CFP(s) prior to the current CFP. For convenience of description, the SINR-based selection method is described by taking an example in which a terminal uses an SINR estimated in two CFPs. If a terminal tries to reserve a data transmission resource block in a P-th (P is a natural number) CFP, the terminal calculates an average SINR of data transmission resource blocks $DRB_0$-$DRB_{N-1}$ by averaging the SINR of each of the data transmission resource blocks $DRB_0$-$DRB_{N-1}$ estimated in a (P−1)-th CFP and the SINR of each of the data transmission resource blocks $DRB_0$-$DRB_{N-1}$ estimated in a (P−2)-th CFP. Furthermore, the terminal may select at least one (e.g., 4) data transmission resource block that belongs to the data transmission resource blocks $DRB_0$-$DRB_{N-1}$ and that has a low average SINR and transmit a scheduling request message including information about the index of the selected data transmission resource block in the P-th CFP.

Figure 3:
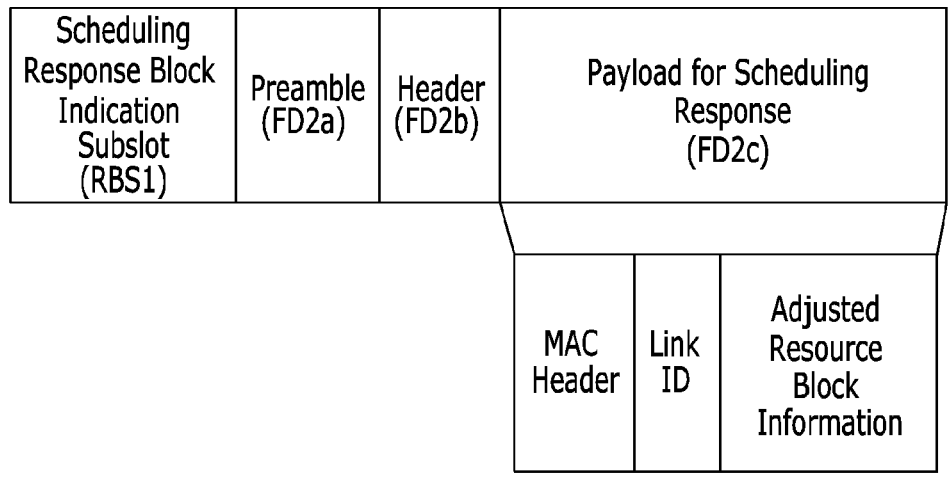
FIG. 3 is a diagram illustrating the format of a scheduling response resource block.

FIG. 3 is a diagram illustrating the format of a scheduling response resource block. Specifically, a scheduling response indication signal may be transmitted through a first response subslot RBS1, and a scheduling response message may be transmitted through a second response subslot RBS2.

The format of the scheduling response message is similar to the format of the scheduling request message of FIG. 2. A difference between the format of the scheduling response message and the format of the scheduling request message is described in detail.

The scheduling response message includes a preamble FD2a, a header FD2b, and a payload FD2c.

The preamble FD2a may be placed next to the first response subslot RBS1.

The payload FD2c includes a MAC header, a link identifier, and information about a data transmission resource block. Specifically, the information about a data transmission resource block which is included in the payload FD2c means information about the indices of the remaining resource blocks that belong to data transmission resource blocks requested by a counterpart terminal (i.e., information about data transmission resource blocks included in a scheduling request message received from the counterpart terminal) and that are other than resource blocks having a resource collision possibility. For example, if a terminal receives a scheduling request message, including information about the indices of data transmission resource blocks $DRB_1$, $DRB_2$, and $DRB_3$, from a peered counterpart terminal, and receives a scheduling request message, including information about the index of the data transmission resource block $DRB_2$, from another terminal, the terminal may transmit a scheduling response message including information about the indices of the data transmission resource blocks $DRB_1$ and $DRB_3$.

Figure 4:
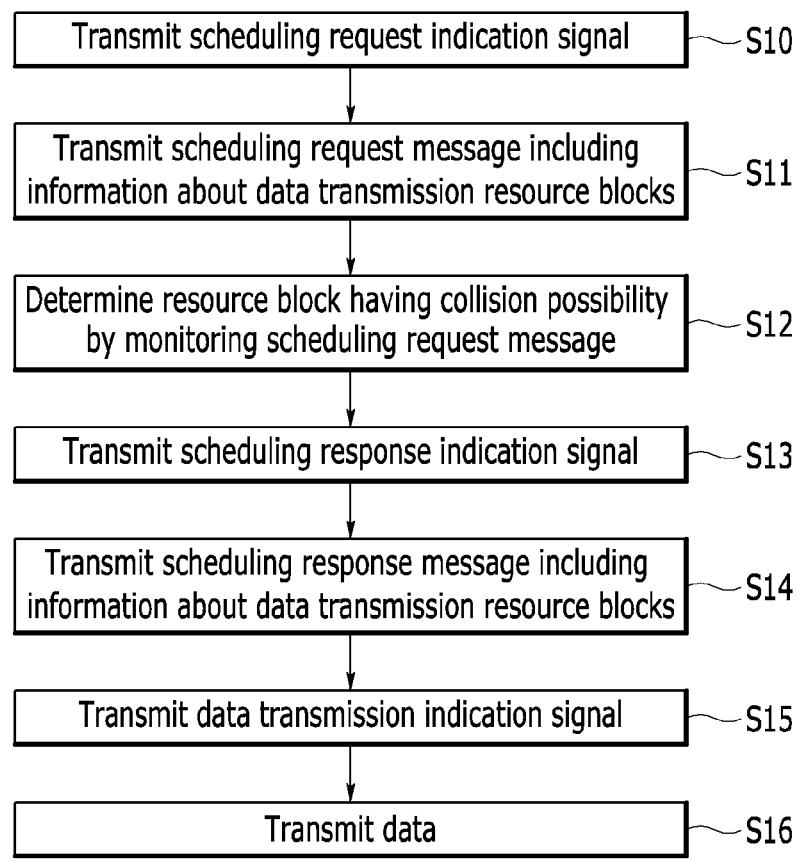
FIG. 4 is a diagram illustrating a distributed scheduling method in accordance with an embodiment of the present invention.

FIG. 4 is a diagram illustrating a distributed scheduling method in accordance with an embodiment of the present invention.

If a terminal wants to reserve data transmission resources, the terminal transmits a scheduling request indication signal and a scheduling request message defined as in FIG. 2 competitively within the scheduling request block group RBG1 of FIG. 1 (S10, S11). For example, it is assumed that the terminal occupies the scheduling request resource blocks $QRB_1$ of FIG. 1 and transmits a scheduling request indication signal and a scheduling request message. The terminal first transmits (e.g., broadcasts) the scheduling request indication signal, generated in a physical layer, through the first request subslot QBS1 of the scheduling request resource block $QRB_1$ (S10). Specifically, the scheduling request indication signal may be a signal having terminal commonness (i.e., a perfect correlation between the signals of terminals) or may be a signal having terminal orthogonality (i.e., a non-correlation between the signals of different terminals). All the terminals that receive a scheduling request indication signal may perform energy estimation (e.g., average power level estimation for a specific period may be used regardless of a terminal that has sent a scheduling request indication signal. Meanwhile, all sensing estimation methods other than the average power level estimation may be applied to an embodiment of the present invention) within the time period of the first request subslot QBS1 and may recognize that someone transmits a scheduling request message (information) if the estimated energy level is a specific threshold level or more. Meanwhile, in order to take into consideration a processing time necessary to demodulate the scheduling request information, propagation delay between transmission and reception, and all other required times, a nulling period (i.e., a non-transmission period) may be present (added) prior or posterior to the scheduling request indication signal.

If an energy estimation level is lower than a threshold level, any terminal that has performed energy estimation may be considered to not transmit a scheduling request message, and another terminal may use the period of the scheduling request resource block $QRB_1$ for a specific purpose. However, if the energy estimation level is higher than the threshold level, a terminal that has performed energy estimation may consider that someone will subsequently transmit a scheduling request message in the period of the scheduling request resource block $QRB_1$. Accordingly, the period of the scheduling request resource block $QRB_1$ can be prevented from being used by other terminals. That is, the terminal may provide notification that the scheduling request message will be subsequently transmitted by transmitting the scheduling request indication signal in the scheduling request resource blocks $QRB_1$. Furthermore, the use of the scheduling request resource blocks $QRB_1$ by other terminals can be prevented. Accordingly, the scheduling request attempts of terminals participating in distributed scheduling can certainly prevent the attempts of terminals not participating in the distributed scheduling to use resources except a collision attributable to a contention between the participating terminals. Meanwhile, in order to guarantee the use of scheduling request resources over a wider surrounding area, some (e.g., a terminal occupying a scheduling request resource block) or all of the terminals participating in distributed scheduling may transmit a scheduling request indication signal through the first request subslot QBS1 in some or all of the scheduling request resource blocks $QRB_0$-$QRB_{L-1}$ regardless of transmission/reception mode. That is, terminals cooperatively transmit a scheduling request indication signal, thereby being capable of increasing energy of a scheduling request resource block. Accordingly, the use of scheduling request resources over a wider area can be guaranteed. Meanwhile, the scheduling request indication signal may be the same regardless of a terminal or may be different depending on a terminal.

The terminal that has transmit the scheduling request indication signal in the process S10 transmits (e.g., broadcasts) a scheduling request message (packet) including information about a data transmission resource block (S11). Specifically, the terminal may select a data transmission resource block to be reserved using the aforementioned SINR-based selection method and transmit a scheduling request message, including information about the index of the selected data transmission resource block, through the second request subslot QBS2 of the scheduling request resource blocks $QRB_1$. In order to reduce overhead and to be faithful to the basis of a contention, the terminal may directly transmit the scheduling request message without transmitting a scheduling request indication signal.

Terminals that want to reserve a data transmission resource competitively transmit scheduling request indication signals and scheduling request messages as in the processes S10 and S11 until the scheduling request block group RBG1 is terminated.

During the period of the scheduling request block group RBG1, a terminal(s) in a reception mode state monitors the scheduling request message (information) transmitted by a specific terminal(s) within the period of the scheduling request block group RBG1 (S12). Specifically, a terminal which has received the scheduling request message checks information about the index of a resource block(s) that belongs to data transmission resource blocks requested by specific terminals that have sent the scheduling request messages and that collide against each other. For example, if a terminal receives a scheduling request message including information about the indices of the data transmission resource blocks $DRB_0$-$DRB_5$ from a peered counterpart terminal, receives a scheduling request message including information about the indices of the data transmission resource blocks $DRB_4$ and $DRB_5$ from another terminal, and receives a scheduling request message including information about the indices of the data transmission resource blocks $DRB_3$ and $DRB_5$ from yet another terminal, the terminal checks that there is the possibility of a collision between the data transmission resource blocks $DRB_3$, $DRB_4$, and $DRB_5$.

A terminal that tries to transmit a scheduling response message in the period of the scheduling response block group RBG2 temporally subsequent to the scheduling request block group RBG1 transmits a scheduling response message and a scheduling response indication signal, including information about the indices of the remaining resource blocks that belong to data transmission resource blocks requested by a counterpart terminal (a peered counterpart terminal) with which the terminal wants to communicate and that are other than resource blocks having a collision possibility (the resource blocks determined in the process S12) using the same method (only a scheduling request or a scheduling response is different, but the remainder is the same) as that of the processes S10 and S11 (S13, S14). For example, if the terminal has occupied the scheduling response resource block $RRB_1$, the terminal transmits (e.g., broadcasts) the scheduling response indication signal through the first response subslot RBS1 of the scheduling response resource blocks $RRB_1$ (S13) and transmits (e.g., broadcasts) the scheduling response message through the second response subslot RBS2 of the scheduling response resource blocks $RRB_1$ (S14). That is, the terminal may provide notification that the scheduling response message is transmitted by transmitting the scheduling response indication signal in the scheduling response resource blocks $RRB_1$, and the use of the scheduling response resource blocks $RRB_1$ can also be prevented from being used by other terminals. In this case, other terminal(s) in a reception mode state checks the received scheduling response message (information) and competitively transmit their resource response information in the period of the scheduling response resource blocks $RRB_0$-$RRB_{M-1}$ until the scheduling response block group RBG2 is terminated as in the processes S10 and S11 with respect to the remaining resource blocks. Specifically, a terminal(s) in a reception mode state may check the received scheduling response information and check whether there is a resource block that belongs to data transmission resource blocks requested by a counterpart terminal(s) peered with the terminal(s) and that has a collision possibility. For example, if a terminal receives a scheduling request message including information about the data transmission resource blocks $DRB_4$-$DRB_7$ from a peered counterpart terminal, and receives a scheduling response message including information about the data transmission resource blocks $DRB_0$-$DRB_2$ from another terminal, the terminal transmits a scheduling response message including the information about the data transmission resource blocks $DRB_4$-$DRB_7$. For another example, if a terminal receives a scheduling request message including information about the data transmission resource blocks $DRB_4$-$DRB_7$ from a peered counterpart terminal, receives a scheduling request message including information about the data transmission resource blocks $DRB_6$ and $DRB_7$ from another terminal, and receives a scheduling response message including information about the data transmission resource blocks $DRB_0$-$DRB_2$ from yet another terminal, the terminal transmits the scheduling response message including the information about the data transmission resource blocks $DRB_4$ and $DRB_5$. As a result, the terminal that has sent the scheduling request message including the information about the data transmission resource blocks $DRB_4$-$DRB_7$ checks that the data transmission resource blocks $DRB_6$ and $DRB_7$ have been excluded from the data transmission resource blocks $DRB_4$-$DRB_7$ requested by the terminal itself due to a collision possibility through the response message (including the information about the data transmission resource blocks $DRB_4$ and $DRB_5$) transmitted by its peer terminal. In order to reduce overhead and to be faithful to the basis of a contention, a terminal may directly transmit only a scheduling response message without transmitting a scheduling response indication signal. The scheduling response indication signal and the scheduling request indication signal may be physically the same or different. In order to guarantee the use of scheduling request resources over a wider surrounding area, some (e.g., a terminal occupying a scheduling response resource block) or all of the terminals participating in distributed scheduling may transmit a scheduling response indication signal through the first response subslot RBS1 in some or all of the scheduling response resource blocks $RRB_0$-$RRB_{M-1}$ regardless of transmission/reception mode. That is, terminals cooperatively transmit a scheduling response indication signal, thereby being capable of enhancing energy of a scheduling response resource block. Accordingly, the use of scheduling response resources can be guaranteed in a wider area. Meanwhile, the scheduling response indication signal may be the same regardless of a terminal or may be different depending on a terminal.

A terminal(s) to which a specific data transmission resource block(s) has been allocated (reserved) through the aforementioned scheduling request and response processes (S10-S14) performs data communication in a contention-free manner in a data transmission period (DTP) subsequent to the scheduling response block group RBG2 (S15, S16). Although a specific data transmission resource block within a data transmission period (DTP) has been allocated to a terminal, contention-free resources for data communication may not be stably guaranteed due to hindrance attributable to other terminals (including hidden terminals). In order to solve such a problem, the terminal may transmit a data transmission indication signal as in the process S10 or the process S13 at the start part of a reserved data transmission resource block(s). That is, the terminal may provide notification that data is transmitted through the second data subslot DBS2 (S16) by transmitting the data transmission indication signal through the first data subslot DBS1 of the reserved data transmission resource block (S15). Furthermore, the use of the corresponding data transmission resource block by other terminals can be prevented. Accordingly, the data transmission of reserved resources in an unlicensed band can be guaranteed.

In order to guarantee the use of data transmission resources over a wider surrounding area, some (e.g., a terminal that has reserved a data transmission resource block) or all of terminals participating in distributed scheduling may transmit a data transmission indication signal through the first data subslot DBS1 in some or all of the data transmission resource blocks $DRB_0$-$DRB_{N-1}$ regardless of transmission/reception mode. That is, terminals cooperatively transmit a data transmission indication signal, thereby being capable of increasing energy of a data transmission resource block. Accordingly, the use of data transmission resources over a wider area can be guaranteed. The data transmission indication signal may be the same regardless of a terminal or may be different depending on a terminal.

Only terminals having the right of using a data transmission resource block may transmit a data transmission indication signal through the first data subslot DBS1 from the first data transmission resource blocks $DRB_0$ of a data transmission period (DTP) to a resource block that belongs to resource blocks allocated to the terminals and that have a maximum index regardless of transmission/reception mode (hereinafter, a 'first transmission method'). For example, it is assumed that two data transmission resource blocks $DRB_0$ and $DRB_2$ have been allocated (reserved) to a first terminal, one data transmission resource block $DRB_1$ has been allocated to a second terminal, and one data transmission resource block $DRB_5$ has been allocated to a third terminal. In this case, the first terminal transmits a data transmission indication signal through a first data subslot DBS1 included in each of the data transmission resource blocks $DRB_0$, $DRB_1$, and $DRB_2$, the second terminal transmits a data transmission indication signal through the first data subslot DBS1 of each of the data transmission resource blocks $DRB_0$ and $DRB_1$, and the third terminal transmits a data transmission indication signal through the first data subslot DBS1 of each of the data transmission resource blocks $DRB_0$-$DRB_5$. In a method in which only terminals to which resources have been allocated participate in the transmission of a data transmission indication signal (a first transmission method), third terminals may freely use data transmission resource blocks that belong to data transmission resource blocks within a data transmission period (DTP) and in which a data transmission indication signal is not transmitted through the first data subslot DBS1, compared to a method in which all the terminals participating in distributed scheduling participate in the transmission of a data transmission indication signal. Coexistence in the use of resources in an unlicensed band can be realized through the first transmission method.

Only terminals which have obtained the right to use a data transmission resource block may transmit a data transmission indication signal through the first data subslot DBS1 of a reserved data transmission resource block (hereinafter, a 'second transmission method'). For example, it is assumed that two data transmission resource blocks $DRB_0$ and $DRB_2$ have been allocated to a first terminal and one data transmission resource block $DRB_1$ has been allocated to a second terminal. In this case, the first terminal transmits a data transmission indication signal through the first data subslot DBS1 of each of the allocated data transmission resource blocks $DRB_0$ and $DRB_2$, and the second terminal transmits a data transmission indication signal through the first data subslot DBS1 of the allocated data transmission resource blocks $DRB_1$. In such a second transmission method, other terminals may use not-allocated data transmission resource blocks on a contention basis. Accordingly, favorable coexistence can be realized through the second transmission method.

Figure 5:
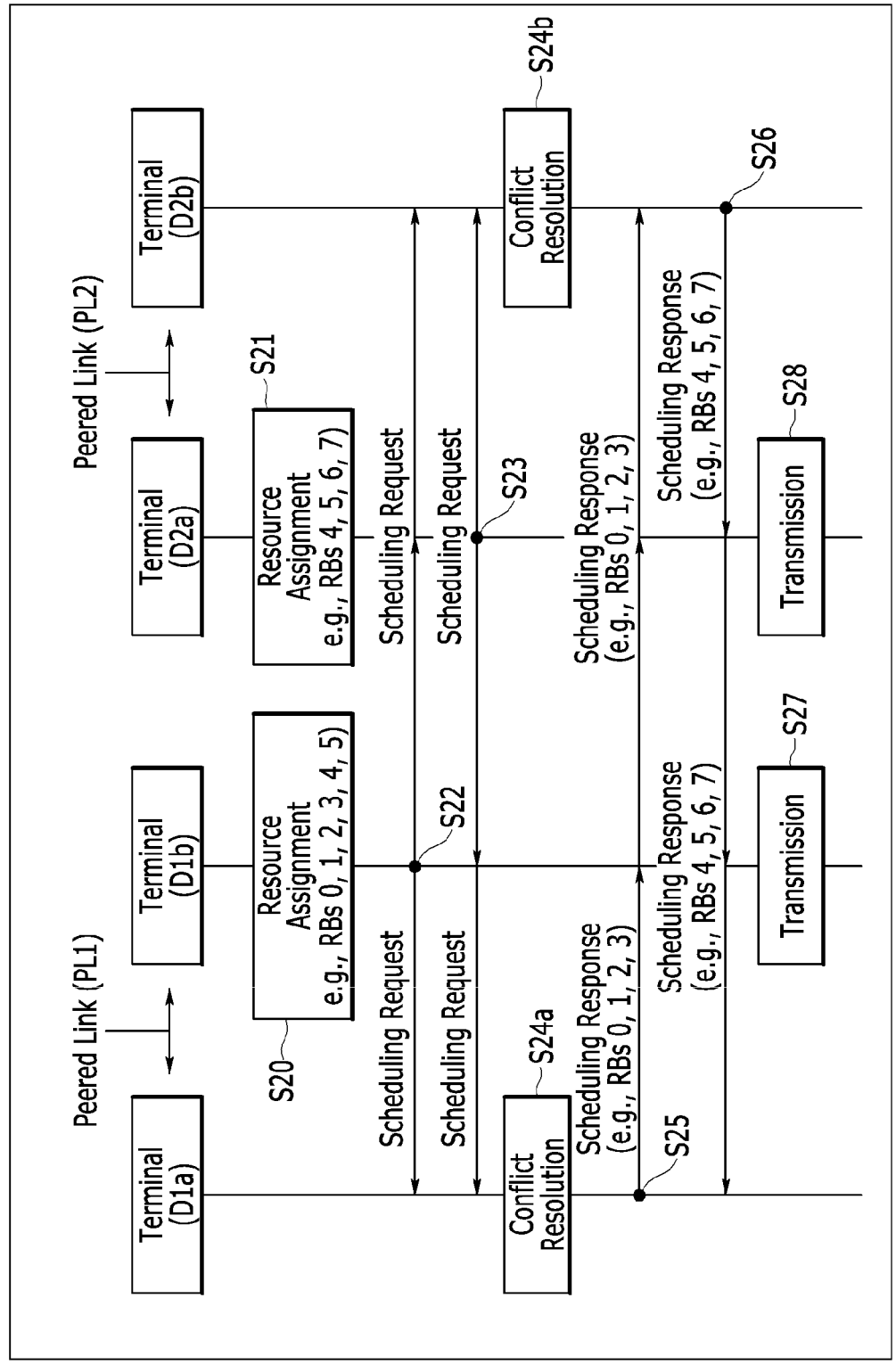
FIG. 5 is a flowchart illustrating a process of performing, by each terminal, distributed scheduling if two pairs of terminals are present.

FIG. 5 is a flowchart illustrating a process of performing, by each of terminals D1$a$, D1$b$, D2$a$, and D2$b$, the aforementioned distributed scheduling if two pairs of the terminals D1$a$-D1$b$ and D2$a$-D2$b$ are present. Specifically, in FIG. 5, it is assumed that the terminal D1$a$ and the terminal D1$b$ have been peered and the terminal D2$a$ and the terminal D2$b$ have been peered through a peering process. A link PL1 is set up between the terminal D1$a$ and the terminal D1$b$, and a link PL2 is set up between the terminal D2$a$ and the terminal D2$b$. Furthermore, in FIG. 5, it is assumed that the terminal D1$a$ and the terminal D1$b$ are spatially adjacent to each other (or placed within an available communication distance), the terminal D2$a$ and the terminal D2$b$ are spatially adjacent to each other (or placed within an available communication distance), the terminal D1$b$ and the terminal D2$a$ are also spatially adjacent to each other (or placed within an available communication distance), the terminal D1$a$ and the terminal D2$a$ are spatially adjacent to each other (or placed within an available communication distance), and the terminal D1$a$ and the terminal D2$b$ are spatially adjacent to each other (or placed within an available communication distance). It is assumed that the terminals D1$a$, D1$b$, D2$a$, and D2$b$ do not receive the signal of a terminal that is spatially far from a corresponding terminal.

The terminal D1$b$, D2$a$ determines data transmission resource blocks to be reserved (to be allocated) (S20, S21). Specifically, the terminal D1$b$, D2$a$ may select the data transmission resource blocks using the aforementioned SINR-based selection method. In FIG. 5, for convenience of description, an example in which the terminal D1$b$ has selected six data transmission resource blocks $DRB_0$-$DRB_5$ and the terminal D2$a$ has selected four data transmission resource blocks $DRB_4$-$DRB_7$ has been illustrated.

The terminal D1$b$, D2$a$ competitively transmits a scheduling request message using the aforementioned distributed scheduling method (S22, S23). Specifically, the terminal D1$b$ broadcasts a scheduling request message including information about the indices of the data transmission resource blocks $DRB_0$-$DRB_5$ determined in the process S20 (S22), as in the processes S10 and S11. Likewise, the terminal D2$a$ broadcasts a scheduling request message, including information about the indices of the data transmission resource blocks $DRB_4$-$DRB_7$ determined in the process S21 (S23), as in the processes S10 and S11.

The terminals D1$a$ and D2$b$ perform collision solution operations using information about the resource blocks included in the scheduling request message received from the terminal D1$b$ and information about the resource blocks included in the scheduling request message received from the terminal D2$a$ (S24$a$, S24$b$). Specifically, the terminal D1$a$ checks the resource blocks $DRB_4$ and $DRB_5$ that belong to the data transmission resource blocks $DRB_0$-$DRB_5$ indicated by the scheduling request message of the terminal D1$b$ and that have a collision possibility (S24$a$), as in the process S12. Likewise, the terminal D2$b$ checks the resource blocks $DRB_4$ and $DRB_5$ that belong to the data transmission resource blocks $DRB_4$-$DRB_7$ indicated by the scheduling request message of the terminal D2$a$ and that have a collision possibility (S24$b$), as in the process S12.

The terminals D1$a$ and D2$b$ competitively transmit their scheduling response messages using the aforementioned distributed scheduling method (S25, S26). FIG. 5 illustrates a case where the terminal D1$a$ has sent the scheduling response message earlier than the terminal D2$b$. Specifically, the terminal D1$a$ broadcasts the scheduling response message including information about the indices of the remaining resource blocks $DRB_0$-$DRB_3$ that belong to the data transmission resource blocks $DRB_0$-$DRB_5$ requested by the terminal D1$b$ and that are other than the data transmission resource blocks $DRB_4$ and $DRB_5$ having a collision possibility (S25), as in the processes S13 and S14. The terminal D2$b$ receives the scheduling response message from the terminal D1$a$ and checks the information about the resource blocks $DRB_0$-$DRB_3$ included in the scheduling response message of the terminal D1$a$. The terminal D2$b$ checks that a data transmission resource block having a collision possibility is not present in the data transmission resource blocks $DRB_4$-$DRB_7$ requested by the terminal D2$a$ by performing a collision solution operation. The terminal D2$b$ broadcasts the scheduling response message including information about the indices of the remaining resource blocks $DRB_4$-$DRB_7$ that belong to the data transmission resource blocks $DRB_4$-$DRB_7$ requested by the terminal D2$a$ and that are other than resource blocks having a collision possibility (S26), as in the processes S13 and S14.

The terminal D1$b$ which has received the scheduling response message of the terminal D1$a$ checks the reserved (allocated) data transmission resource blocks $DRB_0$-$DRB_3$ based on the information of the data transmission resource blocks $DRB_0$-$DRB_3$ included in the scheduling response message of the terminal D1$a$. The terminal D1$a$ transmits data through the reserved data transmission resource blocks $DRB_0$-$DRB_3$(S27) as in the processes S15 and S16. Likewise, the terminal D2$a$ checks the reserved data transmission resource blocks $DRB_4$-$DRB_7$ based on the information of the data transmission resource blocks $DRB_4$-$DRB_7$ included in the scheduling response message of the terminal D2$b$.

The terminal D2$a$ transmits data through the reserved data transmission resource blocks $DRB_4$-$DRB_7$ (S28) as in the processes S15 and S16.

Meanwhile, a terminal that has used data transmission resource blocks may operate in a reception mode state during a predetermined time (e.g., at least one frame time). For example, the terminal D1$a$ that has sent data through the data transmission resource blocks $DRB_0$-$DRB_3$ operates in a reception mode state for a predetermined time. Accordingly, the terminal D1$a$ does not transmit a scheduling request message and performs monitoring (e.g., energy estimation) on the data transmission resource blocks $DRB_0$-$DRB_{N-1}$. After a lapse of the predetermined time, if the terminal D1a tries to transmit a scheduling request message, it may select data transmission resource blocks to be reserved through the SINR-based selection method using a result of the monitoring (e.g., a result of the energy estimation). Accordingly, all the terminals can equally use data transmission resource blocks.

Figure 6:
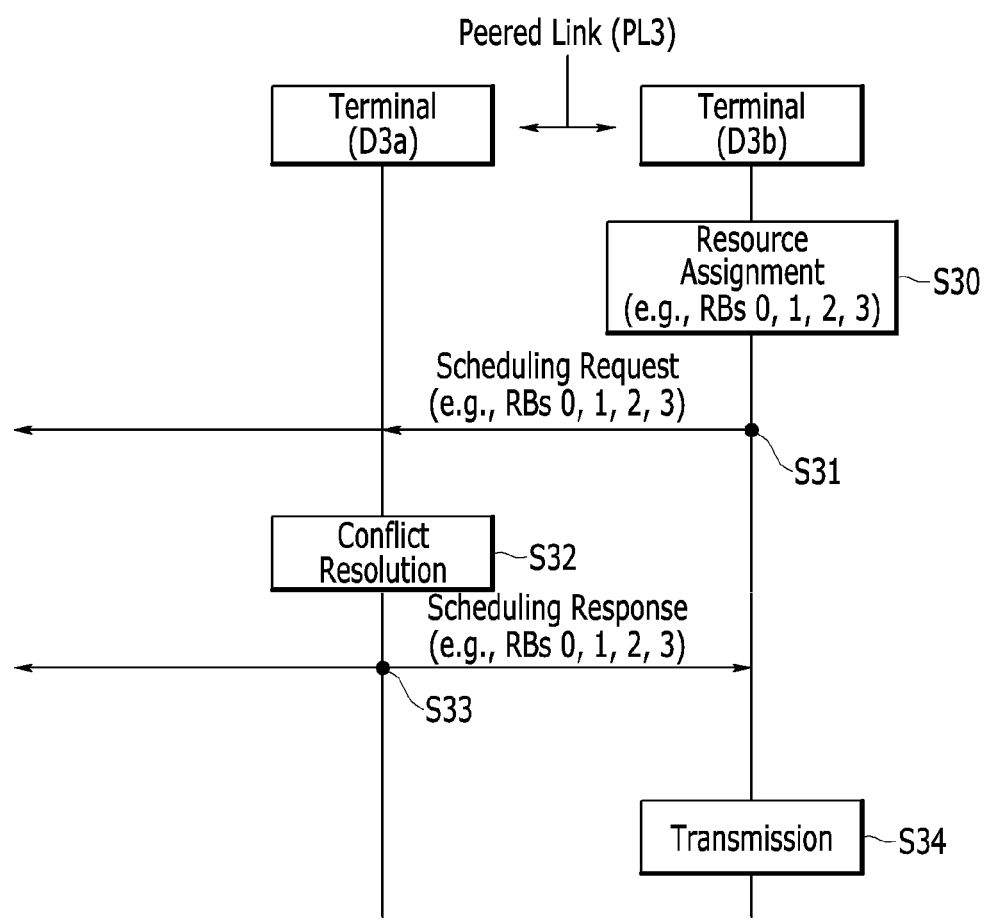
FIG. 6 is a flowchart illustrating a process of performing, by each terminal, distributed scheduling if three pairs of terminals are present.

FIG. 6 is a flowchart illustrating a process of performing, by each of terminals D1a, D1b, D2a, D2b, D3a, and D3b, the aforementioned distributed scheduling if three pairs of the terminals D1a-D1b, D2a-D2b, and D3a-D3b are present. Specifically, FIG. 6 illustrates a case where a pair of the terminals D3a-D3b has been added to the terminal disposition scenario of FIG. 5. In FIG. 6, it is assumed that the assumption of FIG. 5 is applied without a change and the terminal D3a and the terminal D3b have been peered through an additional peering process. A link PL3 is set up between the terminal D3a and the terminal D3b. Furthermore, in FIG. 6, it is assumed that the terminal D3a and the terminal D3b are spatially adjacent to each other (or placed within an available communication distance) and the terminals D3a and D3b and the terminal D2a are also spatially adjacent to each other (or placed within an available communication distance), but the terminals D3a and D3b and the terminal D2a are far away from each other (or not placed within an available communication distance), the terminals D3a and D3b and the terminal D1b are also far away from each other (or not placed within an available communication distance), and the terminals D3a and D3b and the terminal D1a are also far away from each other (or not placed within an available communication distance).

The terminal D3b determines data transmission resource blocks to be reserved (S30). In FIG. 6, for convenience of description, the terminal D3b has been illustrated as having selected four data transmission resource blocks $DRB_0$-$DRB_3$.

The terminal D3b broadcasts a scheduling request message, including information about the indices of the data transmission resource blocks $DRB_0$-$DRB_3$ determined in the process S30 (S31), as in the processes S10 and S11.

Each of the terminal D3a and the terminal D2b that have received the scheduling request message of the terminal D3b performs a collision solution operation on resource blocks requested by each of the terminals D3b and D2a peered with the respective terminals D3a and D2b using the scheduling request information of the terminal D3b (S32). Specifically, the terminal D2b checks that a resource block having a collision possibility is not present in the data transmission resource blocks $DRB_4$-$DRB_7$ requested by the terminal D2a by checking whether the data transmission resource blocks $DRB_0$-$DRB_3$ indicated by the scheduling request message of the terminal D3b are present in the data transmission resource blocks $DRB_4$-$DRB_7$ requested by the terminal D2a. Furthermore, the terminal D2b broadcasts a scheduling response message including information about the indices of the remaining resource blocks $DRB_4$-$DRB_7$ that belong to the data transmission resource blocks $DRB_4$-$DRB_7$ requested by the terminal D2a and that are other than a resource block having a collision possibility, as in the processes S13 and S14. Meanwhile, the terminal D3a which has received the scheduling response message of the terminal D2b checks that a resource block having a collision possibility is not present in the data transmission resource blocks $DRB_0$-$DRB_3$ requested by the terminal D3b by checking whether the data transmission resource blocks $DRB_4$-$DRB_7$ indicated by the scheduling response message of the terminal D2b are present in the data transmission resource blocks $DRB_0$-$DRB_3$ requested by the terminal D3b. The terminal D3a broadcasts a scheduling response message including information about the indices of the remaining resource blocks $DRB_0$-$DRB_3$ that belong to the data transmission resource blocks $DRB_0$-$DRB_3$ requested by the terminal D3b and that are other than a resource block having a collision possibility (S33), as in the processes S13 and S14. That is, the terminal D3a provides notification that all the data transmission resource blocks $DRB_0$-$DRB_3$ requested by the terminal D3b may be reserved through its own scheduling response message.

The terminal D3b which has received the scheduling response message of the terminal D3a checks the reserved (allocated) data transmission resource blocks $DRB_0$-$DRB_3$ based on the information of the data transmission resource blocks $DRB_0$-$DRB_3$ included in the scheduling response message of the terminal D3a. The terminal D3b transmits data through the reserved data transmission resource blocks $DRB_0$-$DRB_3$ (S34), as in the processes S15 and S16.

As in the terminal disposition scenarios illustrated in FIGS. 5 and 6, the terminal D1b and the terminal D3b can use the data transmission resource blocks $DRB_0$-$DRB_3$ within a data transmission period (DTP) at the same time because they are spatially far away from each other. Accordingly, system capacity according to spatial reuse can be increased.

Figure 7:
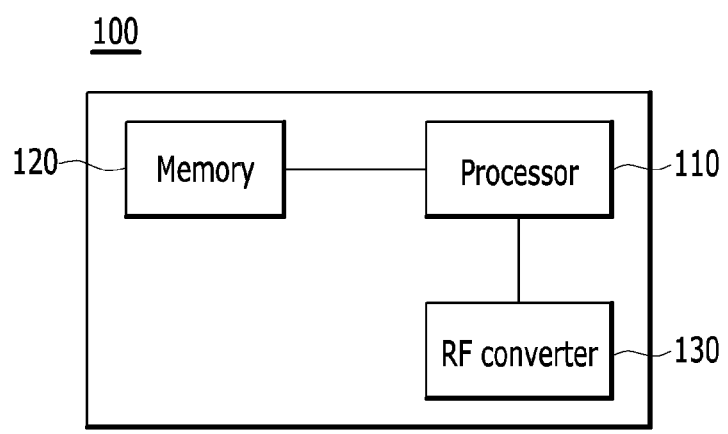
FIG. 7 is a diagram illustrating the configuration of a terminal in accordance with an embodiment of the present invention.

FIG. 7 is a diagram illustrating the configuration of a terminal 100 in accordance with an embodiment of the present invention. The aforementioned terminal may be configured identically with the terminal 100.

The terminal 100 includes a processor 110, memory 120, and a radio frequency (RF) converter 130.

The processor 110 may be configured to implement the procedures, functions, and methods related to the terminal and described in FIGS. 1 to 6.

The memory 120 is connected to the processor 110, and stores various information related to the operation of the processor 110.

The RF converter 130 is connected to the processor 110, and transmits or receives radio signals. The terminal 100 may have a single antenna or multiple antennas.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A device to device (D2D) communication method of directly communicating between a first terminal and a second terminal without passing through a network, the method comprising:

requesting, by the first terminal, that the second terminal reserve first data resources for data transmission by generating a first scheduling request signal comprising information about the first data resources;

generating, by the first terminal, a first scheduling request indication signal providing notification that the first scheduling request signal is to be transmitted; and receiving, by the first terminal, a first scheduling response signal from the second terminal in response to the second terminal receiving the first scheduling request signal, the first scheduling response signal comprising information about second data resources from among the first data resources, the second data resources being data resources other than data resources having a collision possibility, the first scheduling response signal received through a first scheduling response resource, wherein the first scheduling request indication signal is transmitted through a first request subslot included in a first scheduling request resource before transmitting the first scheduling request signal, and wherein the first scheduling request signal is transmitted through a second request subslot included in the first scheduling request resource.

2. The D2D communication method of claim 1, wherein the receiving the first scheduling response signal comprises:
receiving a first scheduling response indication signal, providing notification that the first scheduling response signal is to be transmitted, through a first response subslot included in the first scheduling response resource from the second terminal; and
receiving the first scheduling response signal through a second response subslot included in the first scheduling response resource from the second terminal after receiving the first scheduling response indication signal.

3. The D2D communication method of claim 1, further comprising:
generating a first data transmission indication signal providing notification that first data is to be transmitted;
transmitting the first data transmission indication signal through a first data subslot included in the second data resources before transmitting the first data; and
transmitting the first data using a second data subslot included in the second data resources.

4. The D2D communication method of claim 3, wherein the first data resources are at least one resource block comprising a plurality of resource elements (REs),
the first scheduling request resource is at least one resource block comprising a plurality of REs, and
the first scheduling response resource is at least one resource block comprising a plurality of REs.

5. The D2D communication method of claim 4, wherein the first scheduling request resource belongs to a request resource block group comprising a plurality of scheduling request resource blocks,
the second scheduling response resource belongs to a response resource block group comprising a plurality of scheduling response resource blocks,
the request resource block group and the response resource block group are included in a scheduling period,
the first data resources belong to a data transmission period comprising a plurality of data transmission resource blocks, and
the scheduling period and the data transmission period are included in a contention-free period (CFP).

6. The D2D communication method of claim 5, wherein the transmitting the first data transmission indication signal comprises transmitting the first data transmission indication signal through each of the first data subslots from a first data transmission resource block included in the data transmission period to a last data transmission resource block included in the second data resources.

7. The D2D communication method of claim 4, wherein the generating the first scheduling request signal comprises generating the first scheduling request signal comprising a preamble, a header, and a payload,
the header comprises information indicating that the first scheduling request signal is a signal for a scheduling request,
the payload comprises resource block indexes indicative of the first data resources, and
the payload further comprises a link identifier indicative of a link between the first terminal and the second terminal when the second terminal is a terminal peered with the first terminal.

8. The D2D communication method of claim 5, further comprising receiving a second data transmission indication signal through at least one of the first data subslots included in the data transmission period from another terminal which has not reserved a data transmission resource block included in the data transmission period.

9. The D2D communication method of claim 5, wherein the transmitting the first data transmission indication signal comprises transmitting the first data transmission indication signal through only the first data subslots of data transmission resource blocks included in the second data resources.

10. The D2D communication method of claim 5, wherein the generating the first scheduling request signal comprises:
selecting at least one data transmission resource block that belongs to a plurality of data transmission resource blocks included in the CFP of a frame prior to a current frame and that has a low signal to interference noise ratio (SINR) as the first data resources; and
generating the first scheduling request signal comprising information about a data transmission resource block that belongs to a plurality of data transmission resource blocks included in the CFP of the current frame and that corresponds to the first data resources.

11. The D2D communication method of claim 10, wherein the selecting the at least one data transmission resource block as the first data resources comprises calculating an average SINR during some frames prior to the current frame with respect to each of the data transmission resource blocks included in the CFP of the frame prior to the current frame.

12. The D2D communication method of claim 5, further comprising operating in reception mode during at least one frame when the first data has been transmitted using the second data resources.

13. A device to device (D2D) communication method of directly communicating by a first terminal with a second terminal without passing through a network, the method comprising:
receiving, from the second terminal, a first scheduling request signal comprising information about first data resources for data transmission through a first scheduling request resource;
determining, by the first terminal, whether a collision possibility exists with any of the first data resources between the second terminal and another terminal;
generating, by the first terminal, a first scheduling response signal comprising information about remaining second data resources among the first data resources, the second data resources being data resources other than data resources having a collision possibility; and
transmitting the first scheduling response signal through a second response subslot of a first response subslot and the second response subslot included in a first scheduling response resource for a scheduling response.

14. The D2D communication method of claim 13, further comprising:

generating a first scheduling response indication signal providing notification that the first scheduling response signal is to be transmitted; and transmitting the first scheduling response indication signal through the first response subslot included in the first scheduling response resource before transmitting the first scheduling response signal, wherein the first scheduling request resource is at least one resource block comprising a plurality of resource elements (REs) and belongs to a scheduling period comprising a plurality of scheduling request resource blocks, the first scheduling response resource is at least one resource block comprising a plurality of REs and belongs to the scheduling period further comprising a plurality of scheduling response resource blocks, the first data resources are at least one resource block comprising a plurality of REs and belong to a data transmission period comprising a plurality of data transmission resource blocks, and the scheduling period and the data transmission period are included in a contention-free period (CFP).

15. The D2D communication method of claim 14, wherein the generating the first scheduling response signal comprises determining remaining data transmission resource blocks that belong to the first data resources and that are other than data transmission resource blocks indicated by the second scheduling request signal to be the second data resources when a second scheduling request signal is received from another terminal other than the second terminal.

16. The D2D communication method of claim 15, wherein the generating the first scheduling response signal further comprises generating the first scheduling response signal comprising a preamble, a header, and a payload, the header comprises information indicating that the first scheduling response signal is a signal for a scheduling response, the payload comprises resource block indexes indicative of the second data resources, and the payload further comprises a link identifier indicative of a link between the first terminal and the second terminal when the second terminal is a terminal peered with the first terminal.

17. A device to device (D2D) communication method of directly communicating, by a first terminal, with a second terminal without passing through a network, the method comprising:

generating, by the first terminal, a first data transmission indication signal providing notification that first data is to be transmitted;

transmitting the first data transmission indication signal through a first data subslot before transmitting the first data, wherein a first data transmission resource block includes the first data subslot and a second data subslot;

transmitting the first data through the second data subslot included in the first data transmission resource block, wherein the first data transmission resource block belongs to a data transmission period comprising a plurality of data transmission resource blocks, wherein the data transmission period and a scheduling period for scheduling are included in a contention-free period (CFP), and wherein the D2D communication method further comprises:

selecting a second data transmission resource block based on a signal to interference noise ratio (SINR) of each of a plurality of data transmission resource blocks included in the CFP of a frame prior to a current frame in order to reserve the second data transmission resource block comprising the first data transmission resource block before the transmitting the first data transmission indication signal;

generating a first scheduling request signal comprising information about the second data transmission resource block included in the CFP of the current frame; and transmitting the first scheduling request signal through a second request subslot of a first request subslot and the second request subslot included in a first scheduling request resource block of the scheduling period.

18. The D2D communication method of claim 17, wherein the transmitting the first data transmission indication signal comprises transmitting the first data transmission indication signal through each of the first data subslots from a first data transmission resource block included in the data transmission period to the first data transmission resource block.

* * * * *